(WITHOUT MODULATING COILS)
Fig. 7A

(WITH MODULATING COILS)
Fig. 7B

INVENTORS
HENNING KARLBY
HOWARD REED GRUNDY
JOHN R. SPEER
GEORGE D. HALL
BY Strauch, Nolan, Neale, Nies & Bronaugh
ATTORNEYS

Fig. 6A
FULL WAVE
A.C. CIRCUIT CONNECTION

Fig. 6B
FULL WAVE
A.C. REVERSING CONNECTION

Fig. 6C
A.C. HALF WAVE CIRCUIT CONNECTION

Fig. 6D
A.C. HALF WAVE SCR CIRCUIT CONNECTION

Fig. 6E
A.C. FULL WAVE SCR CIRCUIT

Fig. 6F
A.C. FULL WAVE SCR CIRCUIT

Fig. 6G
A.C. FULL WAVE BLOCKED BRIDGE CIRCUIT

Fig. 6H
A.C. FULL WAVE BACK-TO-BACK SCR CIRCUIT

INVENTORS
HENNING KARLBY
HOWARD REED GRUNDY
JOHN R. SPEER
GEORGE D. HALL

BY
*Strauch, Nolan, Neale, Nies & Bronaugh*
ATTORNEYS

United States Patent Office 3,427,484
Patented Feb. 11, 1969

3,427,484
PERMANENT MAGNET STATOR DC MOTOR WITH HAND TOOL GEAR TRAIN
Henning Karlby, Pittsburgh, Howard Reed Grundy, Murrysville, John R. Speer, Pittsburgh, and George D. Hall, Verona, Pa., assignors to Rockwell Manufacturing Company, Pittsburgh, Pa., a corporation of Pennsylvania
Filed Sept. 28, 1965, Ser. No. 490,800
U.S. Cl. 310—47      18 Claims
Int. Cl. H02k 7/14

ABSTRACT OF THE DISCLOSURE

Permanent magnet stator DC motor having coils on the permanent magnets for improving commutation, increasing motor efficiency, and preventing demagnetization of the field magnets. The coils are connectible to diverse circuitry including bridge rectifiers, silicon controlled rectifiers, and a reversing switch. A gear train is provided when the motor is used with a hand tool.

---

The present invention relates to a novel electric motor adapted to operate from pulsating as well as a steady, direct voltage, and the illustrated embodiment will be described in connection with the use of both steady state as well as a rectified, but unfiltered, alternating voltage as may be obtained from power mains and as having permanent magnets for producing the main portion of the torque producing field during normal operation.

With the availability of lightweight magnets having high coercivity and resistivity and low permeability new design techniques for small electric motors have become feasible which were not previously practicable. Small electric motors having a permanent magnet motive field have been provided which are capable of operation from rectified, but unfiltered, alternating voltage as well as a steady direct voltage and which can be started without the use of a starting box even with full operating voltage applied directly to the motor terminals. However, to avoid demagnetization of the permanent magnets by the current inrush during starting, reversing or with a stalled armature, it has been the practice to use an armature winding having an excessive amount of resistance. Accordingly, the speed-torque curve of the motor falls off undesirably fast as the motor is loaded, and the maximum and rated horsepower output as well as the electrical efficiency of the motor are low.

It is an object of the present invention to provide in a D.C. motor having its motive field produced by permanent magnets, a novel method and apparatus for preventing demagnetization of the permanent magnets to the point where the motor is rendered inoperative due to current inrush during starting, reversing and with stalled armature.

Another object of the present invention is to provide a novel motor adapted to be operated with a pulsating direct voltage which has an improved power output and increased efficiency.

A further object of the present invention is to provide a novel motor adapted to be supplied from a source of pulsating direct power in which the current in the field coils is substantially in phase with and has substantially the same wave form as the current in the armature whereby increased efficiency and output are realized.

A still further object is to provide in a motor a novel coil arrangement associated with the means for providing the main motive field for varying the magnetic field strength in accordance with current appearing in the armature.

A still further object is to provide in a motor coil arrangement associated with permanent magnets used to provide the main motive field and connected with the source of operating voltage, either D.C. or rectified but unfiltered A.C., to prevent any substantial demagnetization of the permanent magnets.

Another object is to provide in a motor having permanent magnets, coils around the magnets and connected in series with the armature to improve commutation by increasing the main magnetic field to neutralize the effect of the magnetic field produced by the armature which is in quadrature with the main magnetic field thereby to prevent demagnetization of the permanent magnets under starting or blocked rotor conditions or when the motor is reversed.

These and other objects will become more fully apparent from the claims, and from the description as it proceeds in conjunction with the appended drawings wherein:

FIGURES 6a through 6h inclusive show the various alternative wiring diagrams as follows:

In any electric motor, the basic motive effort is produced by tangential force exerted on the rotor, this force being produced by the interaction of the field flux and the current flowing through the armature. The tangential force acting through the radius of the rotor then constitutes the torque of the motor. Thus the size, weight, etc. of an electric motor is proportional to the torque produced.

In the field of power driven tools, in order to gain maximum power output, it is necessary to operate the tool at the highest possible speed and it is desirable that it operate with as little loss of speed under load as possible. Moreover, in hand-held power driven tools it is imperative that this maximum power be obtained from as small and as light a unit as possible. Power being the product of torque and speed, to be light and small for a given power output, a motor must of necessity run at a high speed. Since the form of electric power which is ordinarily available is 60 cycle alternating current, an upper speed limit of 3600 r.p.m. is automatically imposed on 60 cycle A.C. motors, making such motors intolerably heavy and large for hand-held power tools. Thus to obtain a higher specific power output, the choice has in the past usually been between a higher frequency of the supply which is generally not available or commutation, such as utilized in universal motors. While universal motors will run at very high speeds, it is well known that such motors lose speed rapidly under load, a characteristic which is to be avoided if maximum power output is to be maintained.

Another possible alternative if steady state D.C. or if rectified A.C. power is available is the use of shunt motors which produce the desired characteristics, that is they can be operated at high speed and the speed will not vary appreciably with load. However, ordinary small wound field shunt motors by their nature are afflicted with bad commutation, and relatively poor efficiency. The reason for this is that since the flux produced by the shunt wound field is essentially constant and does not vary with the load, while the field or flux produced by the current flowing through the armature does vary with the load, the effect of the varying armature field or flux produces a cross magnetization effect on the main field which varies with the load. The resultant field therefore varies in direction with load and thus the neutral plane in which the brushes of the machine must be located will vary with the load so that at only one load can commutation be made acceptable for any given brush position. Moreover, the poles of shunt wound machines must be of highly permeable metal and despite the use of laminations, eddy currents are produced thereby increasing the heat loss and depressing the efficiency. Thus for reasons of bad commutation and reduced efficiencies, wound field shunt machines, while producing the desired characteristics are not practical for the small size required in hand-held power tools.

Shunt type machines can be constructed which use permanent magnets in place of the wound field. Alnico has in the past been used to supply the field flux in such machines. However, Alnico or other magnet materials having relatively high permeability and conductivity cause poor commutation and excessive pole face eddy current losses in small size motors of such designs.

It has been found that the advantages of shunt machines, that is high speed and minimum variation of speed under load may to a degree be realized and the effects of bad commutation and eddy current loss reduced somewhat in D.C. machines by utilizing ceramic permanent magnets to produce the main flux instead of conventional wound coils or Alnico permanent magnets. Since the flux produced by a permanent magnet field is constant and does not vary with the load and since the speed of the machine is inversely proportional to the field flux, the speed of such machines varies with load an amount dependent upon the IR drop which is usually low within the operating range of the motor. Recent developments in ceramic permanent magnets have resulted in commercially available permanent magnets which produce a field of sufficient strength so that reasonably acceptable output torques are available. The improvement in commutation by the use of ceramic permanent magnet field poles over that inherent in conventional wound field shunt motors is brought about by the fact that the ceramic material has been found to offer a path of high reluctance to the flux produced by the armature. Thus space occupied by such poles appears as an air gap to the flux of the armature current and such flux therefore is reduced and its cross magnetizing influence on the main field produced by the permanent magnet is correspondingly reduced. This being so, the shift of the neutral plane of the armature with variations in load is not as pronounced as in wound shunt motors and commutation is greatly improved. Also, the ceramic magnet material offers a path of high resistance to eddy currents, which are therefore held to a minimum and losses incident thereto are reduced. The field produced by the permanent magnet being essentially a constant one, such motors perform and have characteristics similar to those of the conventional wound shunt machine without the disadvantages incident to a shunt machine.

Figure 1:
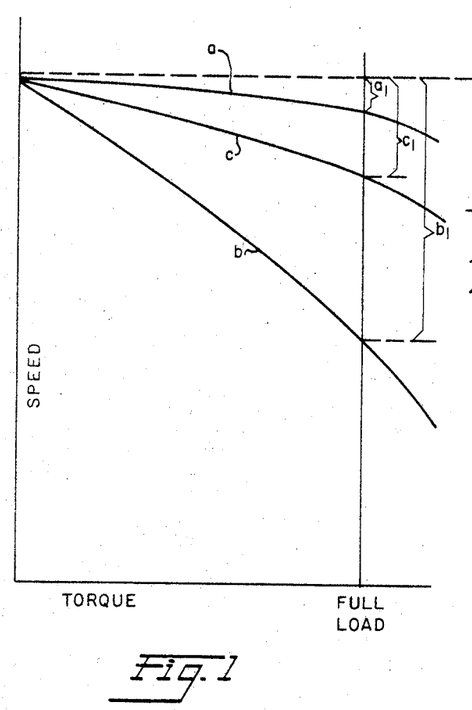
FIGURE 1 is a graph of the speed-torque characteristic of certain prior art motors as compared to the characteristic of a motor embodying the instant invention.

While the use of ceramic permanent magnets would produce the desired operating characteristics, such a motor has its own peculiar problems not previously encountered as follows:

(1) One problem introduced by the use of permanent magnets is that the magnets are subject to demagnetization. That is, at the start or when the rotor is blocked, unless a prohibitively large and expensive starting box is used, a large inrush of current into the armature takes place which produces a field in opposition to the field of the permanent magnet and in many cases is sufficient to demagnetize the permanent magnet thereby rendering the motor inoperative before it ever gets started. This problem has been met in machines which represent the present state of the art by the introduction of a large amount of resistance in the armature, the purpose of this resistance being to limit the current inrush and thereby limit the demagnetizing effect of the armature current on the permanent magnet. Such a resistance, however, has two deleterious effects on the operation of the machine:

(a) It produces an excessive $I^2R$ loss in the armature resulting in excessive heat and inefficient operation, and (b) It tends to increase the speed variation with changes in loads. Since the drop in speed with an increase of load is proportional to the amount of the IR drop in the armature, the greater the armature resistance the greater the variation in speed from no load to full load. This effect is shown in FIGURE 1, in which curve $a$ represents the speed torque characteristic of a conventional wound shunt motor from which it will be noted that the drop in speed at rated load is dependent on the IR drop. In this machine only the resistance inherent in the armature windings is present and the variation in speed is represented by distance $a_1$, (FIGURE 1), curve $b$ on the other hand represents a speed torque characteristic of the same machine having an additional resistance introduced into the armature of a sufficient magnitude to prevent demagnetization from which it can be seen that at the increased IR drop causes an increased loss of speed as the load is increased. Thus present permanent magnet machines which otherwise operate similar to wound shunt motors are subject to demagnetization, and the remedy for that problem, that is increased armature resistance produces an inefficient machine and one which tends to depart from the desired shunt characteristic of minimum speed variation with variation in load.

(2) Rotation of the neutral plane for best commutation under load changes. While as pointed out above, use of permanent magnet machines improves commutation with varying loads over that obtained from ordinary shunt machines, nevertheless, the change in the armature current with the change of load as well as the change in the instantaneous value of the armature current with respect to time causes variation in the cross magnetization effect of the flux produced by the armature current, thereby resulting in a still considerable shift in the neutral plane with load and attendant relatively poor commutation when varying loads are encountered.

(3) The commercially available permanent ceramic magnets have a maximum flux density which places an upper limit on the amount of torque and, therefore the amount of power obtainable with such magnets.

(4) Items 1 to 3 above are encountered when either a steady state or a pulsating supply voltage is used. When power is used for example, such as would be obtained from a full wave or half wave rectifier when only A.C. power is available, the pulsating character of the unfiltered output from the rectifier produces a current in the armature having an undesirable form factor which results in greater heating and reduced efficiencies, and has an adverse effect on commutation.

The present invention overcomes the disadvantages of the prior art motors while still maintaining all the desired advantages of shunt operation, that is high speed operation at rated load with a minimum variation of speed with load variation. Demagnetization of the field is avoided and commutation is improved over the present permanent magnet machines and over the conventional wound shunt motors, both with a steady state and an unfiltered pulsating voltage supply. This is accomplished by use of modulating field windings in a D.C. motor in which the main field flux is produced by permanent magnets. While the advantages of the invention may be realized by connecting the modulating windings either in shunt or series with the armature, the greatest effect and greatest benefit is realized when the modulating coil is connected in series with the armature. According to the teachings of the present invention, a D.C. motor with permanent magnets to produce its main field flux is provided with an auxiliary or modulating field coil which is arranged so that the flux produced by it when supplied with current is in the same direction and is in addition to the flux produced by the permanent magnet pole. When such coil is connected in series with the armature, it may be wound with a certain number of turns so that it will produce a field of sufficient strength when carrying high inrush currents at starting or blocked rotor conditions to overcome the effect of the armature field and prevent demagnetization of the permanent magnet poles, yet at rated speed, the field produced by the coil does not add appreciably to the effect of the main field produced by the permanent magnet poles so that the motor continues to operate with essentially shunt characteristics at rated speed. However, when the influence of the modulating coil is needed most, that is with the large armature current inrush, the field produced by the modulating coils will produce its greatest effect to prevent demagnetization. In other words, when the armature current is greatest, the flux produced by the modulating coils being in the same direction as the field produced by the permanent magnets will be the greatest, but as the motor comes up to rated speed and the armature current is reduced, the flux produced by the coils will diminish and the field produced by the permanent magnets will predominate. Thus while demagnetization is prevented at starting or at blocked rotor conditions, the machine will continue to operate predominantly with a shunt characteristic at rated speeds and loads.

Figure 2:
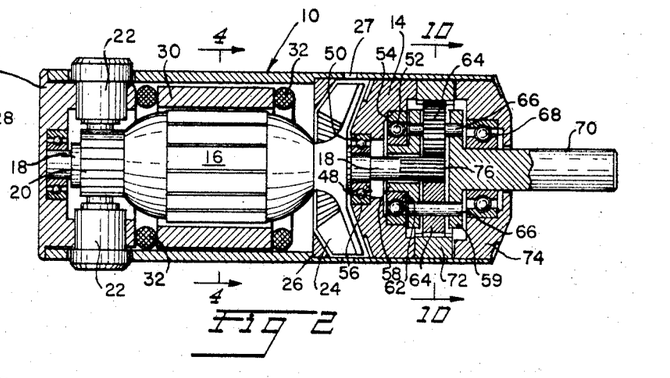
FIGURE 2 is a side elevation in section of the motor of the present invention.
Figure 3:
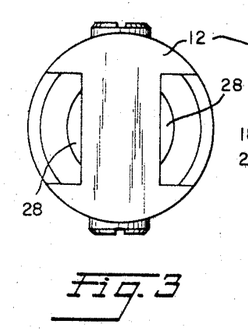
FIGURE 3 is an elevation as seen from the left side of FIGURE 2.
Figure 4:
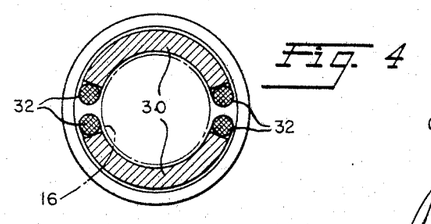
FIGURE 4 is an elevation in section taken along line 4—4 of FIGURE 2.

Referring now to FIGURES 2–4, the motor of the present invention as here illustrated comprises an outer structural case 10 which is cylindrical in shape and must be magnetizable or otherwise provide the back iron for the magnetic circuit, a rear bearing and brush support member 12 and a front bearing support member 14, both of which may be plastic or any suitable metal. The armature 16 is of conventional construction and contains a shaft 18 which is journalled at opposite ends in the rear and front bearings mounted in the corresponding support members 12 and 14. The usual commutator 20 is provided and brush assemblies 22 are mounted in the rear support member 12 adjacent the commutator while the cooling fan 24 is mounted on armature shaft 18 near the front bearing. A ring-shaped fan shroud 26 is positioned between the fan and the portions of the motor containing electrical windings. At the location of fan 24, case 10 is provided with slots 27 for discharging air drawn across the motor and into case 10 through air intake openings 28 on opposite sides of rear support member 12.

On the inside surface of case 10, permanent magnets 30 are secured by any suitable method. While many of the advantages of the present invention are obtained with permanent magnets of other materials, several additional advantages accrue from the use of ceramic permanent magnets. Magnets of such material, preferably ferrite, while producing their own field of a relatively high strength and density are found to present a path of extremely high reluctance to flux produced by other sources such as e.g. the armature current. Moreover, such material also offers a high resistance to current so that eddy currents the held to a minimum without the use of laminations.

In accord with a principal feature of the present invention, coils 32 are provided which surround magnets 30 as illustrated in FIGURES 2 and 4. The coils lie close to the inside wall of case 10. It is not essential that coils 32 completely surround magnets 30 since the demagnetization due to an inrush of armature current occurs primarily at the trailing side of the permanent magnet segments.

In determining the minimum number of turns necessary for each coil 32, the maximum demagnetizing effect produced by the armature may be determined by calculation using the starting transient current value or by test. The intrinsic demagnetization force of the permanent magnet material can also be determined. It is necessary therefore that coil 32 provide at the region on the permanent magnets most likely to be subjected to the demagnetizing effect, sufficient magnetizing force in opposition to the demagnetizing effect of the armature to insure that the permanent magnets are not demagnetized to the point where the machine is rendered inoperative.

For a motor as illustrated in FIGURES 2–4 where case 10 has a 2-inch diameter and a length between bearing support members 12 and 14 of 3 inches, and the armature has a diameter of $1\tfrac{5}{32}$ inches, coils of approximately 40 turns of #24 wire when connected in series with the armature have been found to provide an ample protection against demagnetization of the permanent magnets. There is also an upper limit determined by operating characteristics which will be discussed below.

Figure 5:
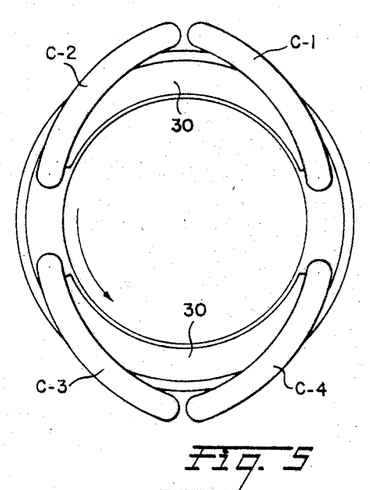
FIGURE 5 is a view similar to FIGURE 4, but of an alternative embodiment having two coils on each permanent magnet rather than one coil as shown in FIGURE 4.

For a reversible motor, a coil arrangement may be used such as illustrated in FIGURE 5. In this embodiment four coils, C–1, C–2, C–3 and C–4, are provided, and case 10 may be apertured to allow the adjacent sides of coils on the same magnet to extend behind the magnet. The disposition of the coils is such that a slight shift in the magnetic field occurs which aids in bidirectional commutation. A similar improvement in commutation was noted when the number of wire turns of these coils was increased 40% over the number required to prevent demagnetization. The coils can be energized, either all four simultaneously or in pairs. For armature rotation as illustrated in FIGURE 5, energization of coils C–2 and C–3 on the trailing magnet sectors provides results that are substantially as good as if all four coils are energized. For reversed armature rotation, coils C–1 and C–3 would be energized.

Coils 32 of the FIGURES 2–4 embodiment and coils C–1 to C–4 of the FIGURE 5 embodiment are connected to prevent demagnetization and improve operating characteristics either in shunt with the armature across the voltage supply or in series with the armature. With the coils connected in series with the armature, high armature inrush currents produce also high currents in the modulating coil and protection against demagnetization can be achieved with a fewer number of turns; also, commutation is improved by virtue of reduction of the shift of the electrical neutral axis, as hereinafter explained. The coils on the opposite magnets may be either in series with each other or in parallel with each other and the two coils connected in series with the armature.

The motor of FIGURES 2–4 may be operated from either a steady state direct voltage or a rectified alternating voltage. However, since A.C. power is usually the only kind available it is necessary to rectify the A.C. power, generally by the use of a full wave or half wave rectifier. Referring to FIGURES 6a–6h, the motor is connected to a source of alternating voltage provided at terminals 36 and 38 through rectifier 40 which is preferably a full wave type as illustrated in FIGURES 6a, 6b, 6e, 6f, 6g and 6h or through a half wave rectifier if desired as shown in FIGURES 6c and 6d. On-off switch 42 may be the usual type as provided on hand-held tools. Such rectifier bridges are available commercially in a very small housing which can be located in the handle or other convenient location on the tool.

If it were possible within the space and cost limitation imposed by hand-held tools to provide a filter of sufficient capacity for the output of rectifier 40, then the problems as identified as item (4) above would be nonexistent. However, space considerations obviate this use of filters and without filters the output from rectifier 40 is simple unfiltered pulsating direct current, and the RMS current value of such a wave form is considerably higher than the AVG current value as is well known.

The $I^2R$ losses and therefore the heating in the motor is based on the RMS value of the current while the torque, and hence the useful output, is based on the average value of the current. Therefore, the maximum efficiency of the motor is obtained with operating power from a steady direct voltage source where the RMS and average current value are equal and the form factor is unity. Form factor is defined as the ratio of the RMS current value to the AVG current value; it is determined by the shape of the current wave form. With a pure sine wave, the RMS current value is .707 of the peak and average current value is .637 of the peak. Hence the form factor is 1.11. As the form factor of the current in the motor increases, the efficiency of the motor decreases resulting in lower horsepower obtainable from the motor.

Figure 7A:
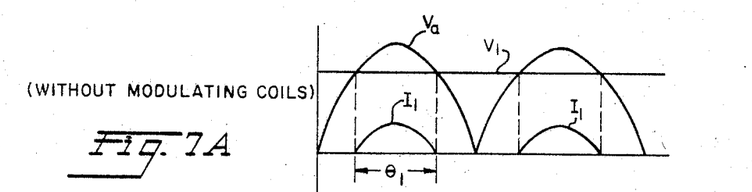
FIGURE 7a is a diagram of the wave forms of the voltage supplied to and the current and back EMF in the armature of a permanent magnet D.C. motor not provided with the present invention.

The present invention permits the use of a pulsating source of D.C. power by improving the form factor of the current wave supplied to the armature. The improvement in the form factor by use of the coils of the present invention not only reduces the heating and therefore increases the efficiency, but also improves the commutation over that of prior art machines. An understanding of how the present invention improves the form factor of the unfiltered pulsating wave form can best be gained by reference to FIGURES 7a and 7b. FIGURE 7a depicts the current and voltage waves in a machine having a permanent magnet to produce the field flux but without modulating coils of the present invention. Curve $V_a$ represents the wave form of an unfiltered voltage from a full wave rectifier which is impressed upon the armature of the motor. Curve $V_1$ represents the back EMF produced in the armature by the steady state field produced by the permanent magnets. As can be seen since the field of the permanent magnet and the speed of the rotor is constant, the back EMF produced in the armature is essentially constant. Under such conditions no current will flow in the armature until the voltage impressed on the armature represented by $V_a$ exceeds the back EMF, at which point current will begin to flow in the armature. So long as the voltage $V_a$ exceeds the back EMF produced by the permanent magnet, current will flow in the armature and the wave form thereof will follow closely the wave shape of the voltage $V_a$. This current is represented in FIGURE 7a as $I_1$ with a conduction angle $\theta_1$.

Figure 7B:
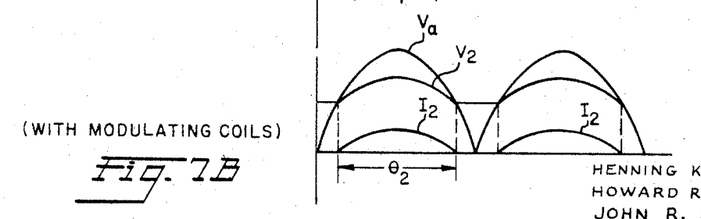
FIGURE 7b is a diagram of the wave forms of the voltage supplied to and the current and back EMF in the armature of a permanent magnet D.C. motor embodying the instant invention.

The curves shown in FIGURE 7b represent the wave forms of the voltages and armature current (Curve $I_2$) which are produced with the use of the modulating coil of the present invention. Such coils when connected in series or shunt with the armature produce a flux which is added to the flux produced by the permanent magnet. The speed of a D.C. shunt motor is inversely proportional to the flux density of the field. An increase in the field flux density due to current in the modulating coils 32 causes a reduction in speed. While the flux density of the field is increased during that portion of each cycle when current is flowing, the flux density of the field is supplied only by the permanent magnets when current is not flowing. Conduction occurs only when the supply voltage $V_a$ is greater than the back EMF $V_2$ in FIGURE 7b. Since the back EMF is directly proportional to the speed of the motor, the voltage $V_a$ exceeds the back EMF $V_2$ earlier in each cycle and drops below the back EMF $V_2$ later in each cycle than in a motor without modulating coils as represented in FIGURE 7a. Therefore, the conduction angle $\theta_2$ (FIGURE 7b) for the motor with modulating coils is larger than the conduction angle $\theta_1$ (FIGURE 7a) for the motor withou modulating coils. It can be shown mathematically that the form factor ($I_{RMS}/I_{AV}$) is reduced as the conduction angle $\theta$ of the current wave form is increased. A lower value of the form factor ($I_{RMS}/I_{AV}$) yields less heat for the same motor output, or more motor output for the same heat generated in the armature resulting in higher efficiency and larger HP of the motor.

Figure 8:
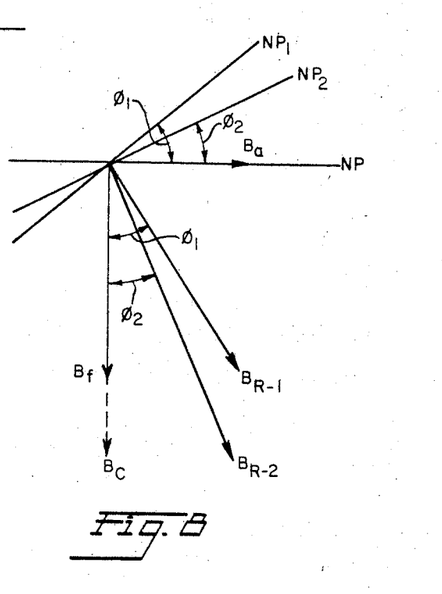
FIGURE 8 is a diagram showing the relative directions and magnitudes of the flux or field produced by the permanent magnets and armature of a D.C. permanent magnet motor with and without the present invention and the effect thereof on the neutral plane of each.

As previously mentioned although the use of permanent magnets alone to provide the field in a D.C. motor improves the commutation over that available from ordinary wound shunt motors, commutation is still not satisfactory due to the fact that neutral plane of permanent magnet machines continues to shift under variations in armature current. The effect of the present invention in improving commutation can be best understood by reference to FIGURE 8. In FIGURE 8, the vector $Bf$ represents the permanent magnet field flux. The no-load neutral plane in such a machine is in quadrature to the main field flux and is, therefore, represented by the line NP. If now a load is put on the machine the current in the armature is increased. The direction of the flux produced by the armature current is also in quadrature to the field and is represented by the vector $B_a$. The direction of the resultant field $B_{r-1}$, therefore, has been shifted an angle $\phi_1$ from the direction of the field $Bf$ and the neutral plane $NP_1$ in quadrature thereto has been similarly rotated an angle $\phi_1$ from the no-load neutral plane NP. Thus it can be seen how the imposition of a load on a machine having only permanent magnets to produce the field causes the neutral plane to rotate.

Considering now the effect of the present invention on the foregoing phenomenon, the field $B_c$ produced by the coils of the instant invention although of lesser magnitude is in the same direction and is additive to the field produced by the permanent magnet $Bf$. If now the same load is imposed on the machine as in the case above described, the same armature current will flow producing the same armature flux $B_a$. If vectors $B_a$, $B_f$ and $B_c$ are now added vectorially, the resultant is a flux represented by the vector $B_{r-2}$, which has a neutral plane in quadrature of $NP_2$. The angle $\theta_2$ represents the shift of the neutral plane from the no-load neutral plane NP to the full load neutral plane $NP_2$ when the coils of the instant invention are utilized. From the foregoing, it will be readily appreciated that the deviation of the neutral plane from the no-load to the full-load position is appreciably reduced with the use of the instant invention thereby improving commutation.

Figure 6A:
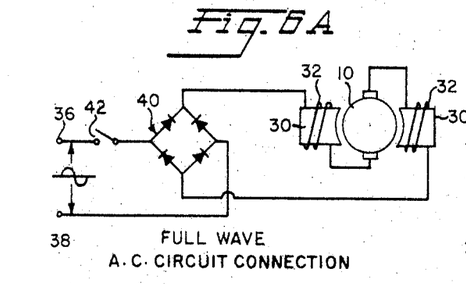
FIGURE 6a shows the circuit connection for full wave rectification of power from an A.C. source.
Figure 6B:
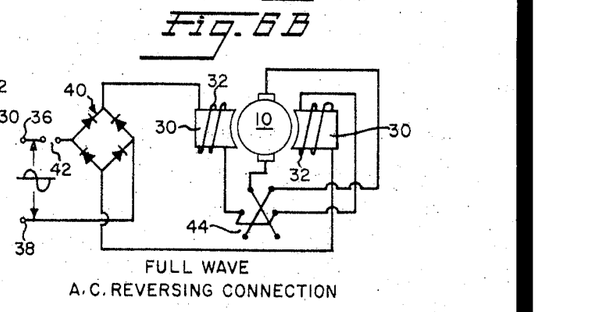
FIGURE 6b shows a circuit similar to 6a but with provision for reversing the direction of rotation.
Figure 6C:
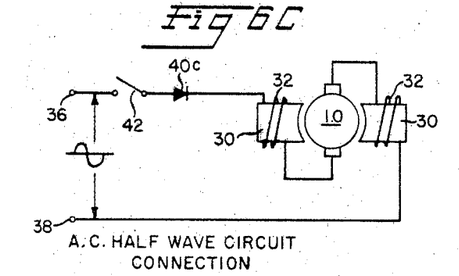
FIGURE 6c shows a circuit providing for half wave rectification of power from an A.C. source.
Figure 6D:
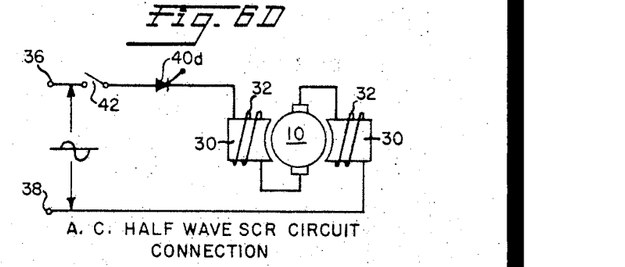
FIGURE 6d shows a circuit providing for half wave rectification of power from an A.C. source and SCR control.

The effect of and the operation of a motor embodying the present invention as heretofore set forth in detail can be summarized as follows:

Referring to FIGURES 6a–6h, when the switch 42 is closed power from the source will be supplied to the motor through full wave rectifier 40, 40a, 40b, half wave rectifier 40c or SCR element 40d as the case may be. Since the armature is initially at rest the initial inrush current will be great. However, this inrush current will be carried by the coils 32 which are wound around or closely adjacent to the permanent magnets 30 in such a manner that the field produced by the coils is in the same direction to strengthen the field produced by the permanent magnets. Therefore, since the same current flows through the coils 32 as flows through the field, the total effect of the coils 32 and the permanent magnets 30 will always be to produce sufficient magnetizing force in opposition to the demagnetizing effect of the armature to prevent demagnetization of the permanent magnets to the point where the motor is rendered inoperative. As the motor comes up to rated or full load speed, the current through the armature and the field coils 32 diminishes from its initial inrush value to its normal operating value. Thus as the demagnetizing effect of the armature diminishes, the effect of the coils 32 similarly diminishes and when the machine is running at its normal operating speed, the magnets 30 will have the predominant effect in producing the motive force and therefore the relative effect by the coils 32 and the magnets 30 at that point will be such that the effect of the magnets will predominate and therefore the machine will operate with essentially the characteristics of a shunt machine.

Where reversing of the shaft rotation is desired, a two pole, double through switch 44 may be added as shown in FIGURE 6b. With ceramic permanent magnets and coils 32 of the present invention to reduce the shift of the electrical neutral axis, commutation problems are sufficiently reduced to allow operation of the armature in either direction. It should be noted that on reversing operations the tendency to demagnetize the permanent magnets of motors not equipped with the present invention is particularly strong, in fact approximately doubled. This is due to the fact that the direction of the voltage supply to the armature is reversed while the armature is still turning in its original direction and therefore the EMF induced in the armature coils due to the field of the permanent magnet will be added to the value of the supply voltage. The total voltage across the armature coils at the instant of reversal will be roughly doubled and the current inrush will be approximately doubled. However, as in the case of starting operations, the coils 32 will produce a magnetizing force which at all times, whether at starting or reversing, is in opposition to and proportionate to the demagnetizing effect of the armature current.

Figure 6E:
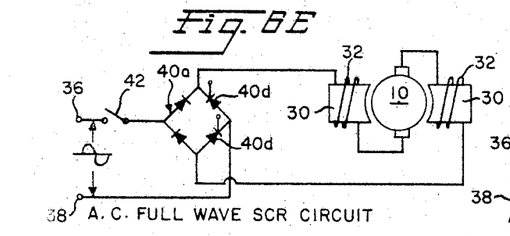
FIGURE 6e shows a circuit providing for full wave rectification of power from an A.C. source and SCR control.
Figure 6F:
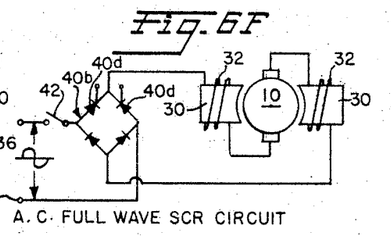
FIGURE 6f shows a circuit providing for full wave rectification of power from an A.C. source with an additional method of SCR control.
Figure 6G:
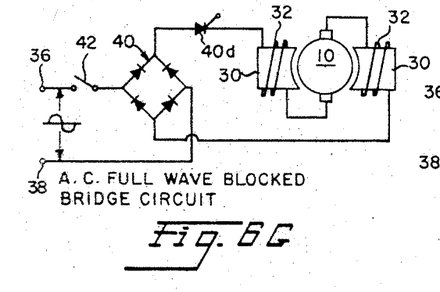
FIGURE 6g shows a circuit providing for full wave rectification of power from an A.C. source with additional means providing for a blocked bridge.
Figure 6H:
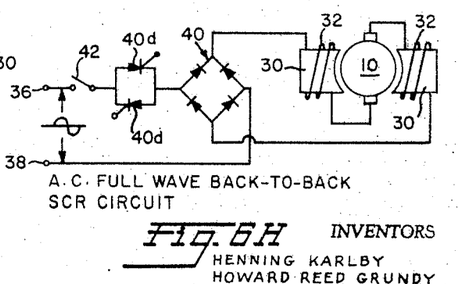
FIGURE 6h shows a circuit providing for full wave rectification of power from an A.C. source and back-to-back SCR control.

Half wave rectifiers may also be used with the present invention and the case of a half wave rectifier 40c in place of the full wave rectifier 40 is shown in FIGURE 6c. Rectification of the A.C. source and speed control may be effected by the use of silicon controlled rectifiers, known as SCR units, and various alternative arrangements as shown in FIGURES 6d–6h inclusive. FIGURE 6d shows an arrangement providing half wave rectification as well as speed control by means SCR 40d connected in the supply to the motor. FIGURES 6e and 6f show alternate circuits providing full wave rectification and speed control in which two of the diodes of a conventional full wave rectifier bridge have been replaced by SCR units 40d. FIGURES 6g and 6h show alternative circuit arrangements providing full wave rectification by means of a conventional full wave rectifier bridge 40 and SCR control by element 40d.

Referring to FIGURE 1, the speed torque characteristic of a motor embodying the present invention is represented by the curve c, and is compared to the speed torque characteristics of a conventional wound shunt machine as shown by curve a, and of a permanent magnet motor without the coils of the present invention as shown by curve b. As previously pointed out, the amount that the speed of a D.C. machine will vary from no-load to full-load depends on the resistance in the armature circuit. Thus in the case of a conventional shunt wound machine as shown by curve a, the intrinsic resistance of the armature circuit is in the armature windings only and the difference in speed between no-load and full-load is represented by the distance $a_1$. In the permanent magnet machines representing the present state of the art without the coils of the present invention as previously explained, it is necessary to introduce a resistance in the armature circuit in order to limit the current inrush at starting and at blocked rotor to prevent demagnetization of the permanent magnet. This high resistance in the armature circuit produces an excessive drop in speed between no-load as represented by the distance $b_1$ in FIGURE 1 and therefore produces an excessive speed variation and therefore a completely unsatisfactory speed torque curve. In motors embodying the present invention, however, while the coils 32 introduce a slight amount of resistance in the armature circuit over and above that in the conventional shunt wound motors, by proper selection of the number of turns of the coils this coil resistance may be kept to a value whereby the drop in speed from no-load to full-load as represented by the distance $c_1$ in FIGURE 1 is acceptable while still realizing the beneficial advantages by the field produced by the coil as hereinabove described.

Thus it will be appreciated that a full realization of the benefits of the present invention require that the coil be properly selected, both as to location, number of turns and internal resistance so that without introducing enough resistance in the armature circuit to produce an intolerable drop in speed from no-load to full-load:

(1) It will produce sufficient flux at starting to prevent demagnetization of the permanent magnets which produce the main field.

(2) As the machine comes up to normal speed and load, the effect of the field produced by the coils will diminish to a point where the field produced by the main magnet will predominate in producing the characteristics of the motor.

As indicated above the main advantage of the instant invention may be realized by connecting the coils 32 in shunt across the armature rather than in series with the armature. In such a case, however, the field introduced by the shunt windings will be constant or caused to vary by other means, and the coils 32 will have sufficient turns to produce a sufficient flux at start to overcome the effects of the flux produced by the inrush current in the armature.

Figure 9:
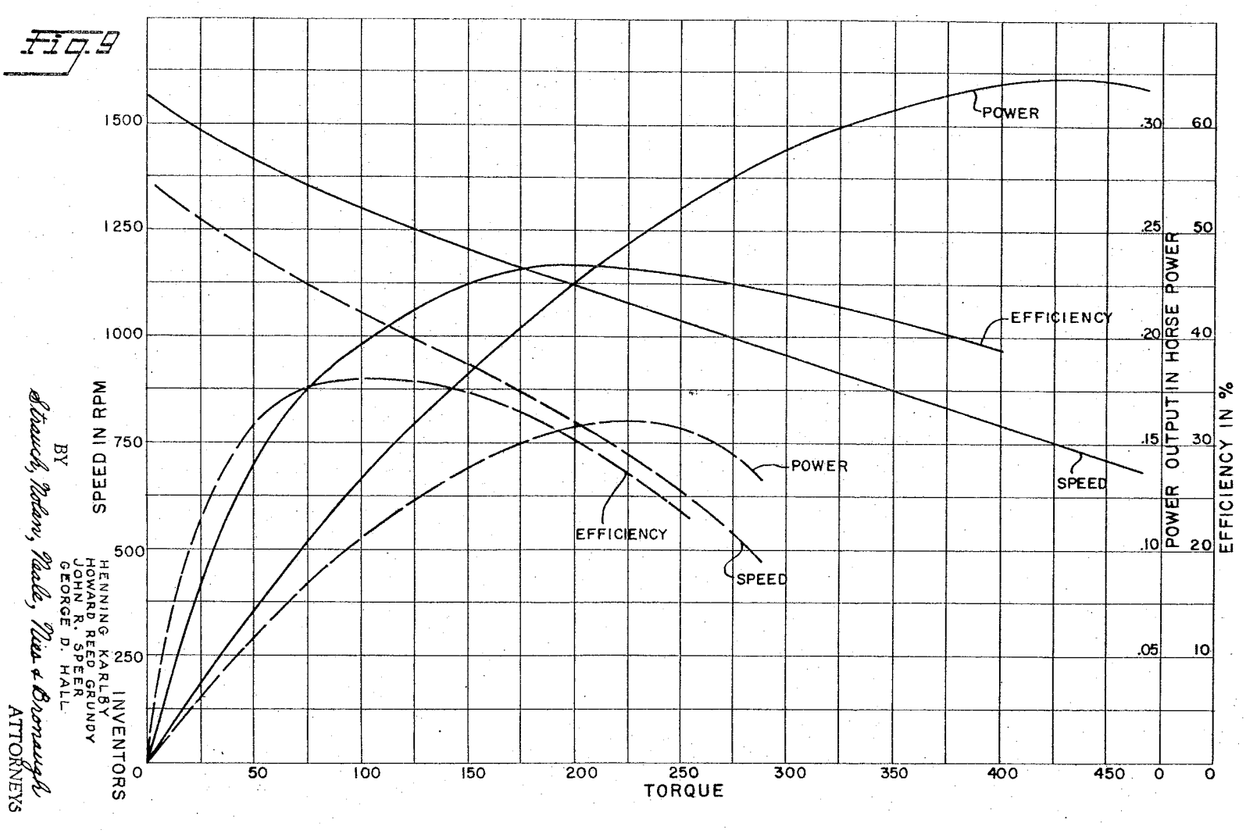
FIGURE 9 shows the performance curves of two motors, the broken line curves representing the performance of prior art motors compared with the performance of a motor embodying the present invention, which is represented by the solid line curves.

A comparison of the speed, efficiency and power of a permanent magnet machine representing the present state of the art and not embodying the present invention, with that of a motor of substantially the same size and weight and embodying the present invention is shown in FIGURE 9. The solid lines represent the performance curves of the motor embodying the present invention, while the dotted lines represent the performance curves of the present state of the art. As can be seen from FIGURE 9, the efficiency of the prior art machine has a peak value of approximately 36%, has a peak efficiency at a torque of approximately 100 in.-oz., while the efficiency of the machine embodying the present invention reaches a peak value at approximately 200 in.-oz. or double that of the prior art machine. Moreover, the peak efficiency of the present invention is increased to 47% by approximately 30% over that of the prior art machine. The power output of the prior art machine peaks out at a torque of approximately 225 in.-oz. and thereafter decreases, while the power available from the present invention machine continues to increase. At an output torque of 200 in.-oz., which is the point of maximum efficiency of the present invention, the efficiency of the prior art machine has dropped off drastically and the speed change of the prior art machine at this point is approximately 42% of the no-load speed as compared to the drop in speed of 25% at this point for the present invention.

*Gear reduction assembly*

Figure 10:
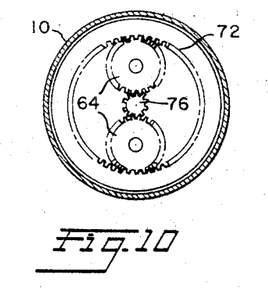
FIGURE 10 is an elevation in section taken through the speed reduction gear assembly along line 10—10 of FIGURE 2.
Figure 11:
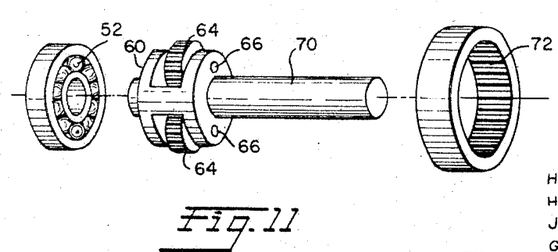
FIGURE 11 is an exploded view of the speed reduction gear assembly attached to the armature shaft of the motor.

With reference now to FIGURES 2, 10 and 11, it is desirable to provide a gear reduction assembly capable of producing a rotational speed of output shaft 70 that is customary for hand-held tools and capable of being contained within a case having a diameter not substantially larger than that for the motor. A unique output reduction assembly has accordingly been provided which is in the form of a planetary speed reduction gear assembly installed over one end of the armature shaft and inside an integral extension of motor case 10.

In one form of the speed reduction unit which may be of light metal or plastic, the planetary ring gear and bearing retainers may be secured in the motor case as by set screws or by a threaded engagement and be either separate parts or formed as a unitary adapter. In the plastic gear assembly embodiment, the planet pinions and ring gear unit may be fabricated by laminated flat gear stampings from plastic sheets and the ring gear may be interlocked to a plastic motor end bell by outer peripheral lugs which engage slots in the inner circumference of the end bell. All ring segments may be clamped into place as with a screw retainer ring. The cage and output shaft can be plastic, whereas the planet shafts and reduction bearing are preferably metal.

In FIGURES 2, 10 and 11 a planetary reduction unit is illustrated as being fitted into one end of case 10. The front end bearing 48 is retained as by a force fit of its outer race 56 in a bearing recess 50 on the interior end of support member 14 and a gear reduction bearing 52 fits in an outer end recess 54 on the exterior end of support member 14.

Cage 60 carries two planet pinion gears 64 between cage end plates 58 and 59, each planet gear being journalled on a pin shaft 66. The inner plate 58 of the planet cage 60 has a sleeve which fits into the inner race 62 of bearing 52 with a tight driving fit. Pin shafts 66 may be inserted from the front end of the cage and retained in their bores in any suitable manner. Output shaft 70 may be made integral with or otherwise secured to planet cage 60 and the inner race of bearing 68 force fit on shaft 70. Output shaft 70 may be adapted to receive a conventional Jacobs' chuck or some other suitable output drive device for a hand tool.

A fixed ring gear 72 is secured between front bearing support 14 and bearing support adapter 74 and meshes with the two planet gears 64. Adapter 74 is secured to case 10 as by set screws not shown. End 76 of armature shaft may have teeth formed on it to serve as an integral sun gear for the planetary reduction unit. When the reduction unit is placed into position in motor case 10, the armature shaft teeth at end 76 mesh with the planet gears 64.

If armature shaft end 76 has 10 teeth and the ring gear 72 has 40 teeth, a 4:1 speed reduction will result. Different speed reductions can be realized merely by changing the reduction unit to one which has a different number of fixed ring gear teeth with different appropriately sized cage and planet gears to enable meshing with the armature shaft end pinion.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A direct current motor comprising a rotatably mounted armature, a winding on said armature, permanent magnet poles surrounding said armature and providing a stationary magnetic field oriented transversely of the conductors of the armature winding, conductors for connecting the ends of said armature winding to the opposite sides of a source of direct current to energize the armature winding and effect rotation of said armature, and means for preventing demagnetization of said permanent magnets, said last-named means being coils connected to said direct current source concomitantly with said armature winding and so wound on said permanent magnets as to when energized produce a magnetic flux additive to that produced by the permanent magnets, said coils being also so connected to said armature winding that the flux resulting from the current flowing in the coils will oppose the flux resulting from the current flowing in the armature winding in the trailing portions of the permanent magnets and thereby prevent demagnetization of the permanent magnets, and said coils being connected in series with the armature winding so that the coil associated flux will be proportional to the flux produced by the current flowing in the armature winding and will therefore be sufficient to prevent demagnetization of the trailing portions of the permanent magnets when the motor is started or reversed or the armature stalled, but will diminish to the point that the flux produced by the permanent magnets will dominate the torque-speed characteristics of the motor as it reaches operating speed.

2. A direct current motor as claimed in claim 1, wherein said coils surround only the trailing edge portions of the permanent magnets.

3. A direct current motor as claimed in claim 1, wherein said permanent magnets are made of a ferritic ceramic material having low permeability and high resistance to the flow of current.

4. A direct current motor as claimed in claim 1, wherein said coils are so dimensioned that the combined magnetomotive forces of the field produced by the permanent magnets and the field produced by the coils wound thereon exceed the force of the magnetomotive field produced by said armature winding when said winding is energized and the armature is at rest.

5. A direct current motor is claimed in claim 1, wherein said coils are so constructed as to produce on the order of about one-fifth to about one-third of the magnetomotive force produced by the permanent magnets at rated motor conditions.

6. A direct current motor comprising a rotatably mounted armature, a winding on said armature, permanent magnet poles surrounding said armateur and providing a stationary magnetic field oriented transversely of the conductors of the armature winding, conductors for connecting the ends of said armature winding to the opposite sides of a source of direct current to energize the armature winding and effect rotation of said armature, and means for preventing demagnetization of said permanent magnets, said last-named means comprising first and second coils connected to said direct current source and so wound on each of said permanent magnets as to when energized to produce a magnetic flux additive to that produced by the permanent magnets, said coils being also so connectable to said armature winding that the flux resulting from the current flowing in the coils will oppose the flux resulting from the current flowing in the armature winding in the trailing portions of the permanent magnets and thereby prevent demagnetization of the trailing portions of the permanent magnets, and switch means for connecting said first coils to said armature winding when the armature is rotating in one direction and the second coils to the armature winding when the armature is rotating in the opposite direction to protect said permanent magnets against demagnetization irrespective of the direction of rotation of said armature.

7. A direct current motor as claimed in claim 6, wherein said coils are connectable in parallel with said armature winding.

8. A direct current motor as claimed in claim 6, wherein said coils are connectable in series with said armature winding.

9. A direct current motor comprising a rotatably mounted armature, a winding on said armature, permanent magnet poles surrounding said armature and providing a stationary magnetic field oriented transversely of the conductors of the armateur winding, conductors for connecting the ends of said armature winding to the opposite sides of a source of direct current to energize the armature winding and effect rotation of said armature, and means for preventing demagnetization of said permanent magnets, said last-named means comprising coils connected to said direct current source and so wound on said permanent magnets as to when energized produce a magnetic flux additive to that produced by the permanent magnets, said coils being also so connectable to said armature winding that the flux resulting from the current flowing in the coils will oppose the flux resulting from the current flowing in the armature winding in the trailing portions of the permanent magnets and thereby prevent demagnetization of the trailing portions of the permanent magnets, and switch means operable to reverse the direction of current flow through said armature without reversing the direction of current flow through said coils to thereby reverse the direction of armature rotation without alteration of the additive relationship between the flux produced by the current flowing in said coils and the flux produced by the permanent magnets, whereby said permanent magnets are protected against demagnetization irrespective of the direction of rotation of said armature.

10. A direct current motor as claimed in claim 9, wherein said coils are connected in parallel with said armature winding.

11. A direct current motor as claimed in claim 9, wherein said coils are connected in series with said armature winding.

12. A direct current motor comprising a rotatably mounted armature, a winding on said armature, permanent magnet poles surrounding said armature and providing a stationary magnetic field oriented transversely of the conductors of the armature winding, conductors for connecting the ends of said armature winding to the opposite sides of a source of pulsating direct current to energize the armature winding and effect rotation of said armature, and means for improving commutation and reducing $I^2R$ losses in the armature winding and thereby increasing the efficiency of the motor, said last-named means including coils connected to said direct current source and so wound on said permanent magnets as to when energized produce a magnetic flux additive to that produced by the permanent magnets and thereby reduce the form factor of the pulsating direct current supplied to the armature winding to increase the conduction angle of the motor, said coils being also so connected to said armature winding as to produce a field which is capable of reducing the shift of the neutral plane as the motor moves between no-load and load conditions.

13. A direct current motor comprising a cylindrical casing, a generally circularly sectioned armature in and extending longitudinally of said casing concentrically therewith, means rotatably supporting said armature from said casing, a winding on said armature, at least one pair of relatively thin, arcuately configured permanent magnets mounted between said casing and said armature and providing a stationary magnetic field oriented transversely of the conductors of the armature winding, said permanent magnets being separated from said armature only by an air gap, conductors for connecting the ends of said armature winding to the opposite sides of a source of direct current to energize the armature winding and effect rotation of the armature, and means for preventing demagnetization of said permanent magnets comprising coils connected to said direct current source and so wound on said permanent magnets as to when energized provide a magnetic flux additive to that produced by the permanent magnets and opposing that resulting from the current flowing in the armature winding to prevent the flux resulting from said last-mentioned current from demagnetizing said permanent magnets.

14. A direct current motor as claimed in claim 13, wherein said magnets have a uniform lateral cross-section and a rectangular longitudinal cross-section relative to the axis of rotation of the armature.

15. The motor of claim 13, wherein each coil embraces at least one lateral edge and the longitudinal ends of the associated magnet and extends across the side of the magnet facing the motor casing.

16. A hand tool comprising a case, a rotatable armature type permanent magnet direct current motor as claimed in claim 1 in said case, and a reduction gear assembly mounted in axial alignment with said armature in said case, said reduction gear assembly including an annular ring gear non-rotatably mounted in said case, a sun gear fixed to the armature shaft of the motor for rotation therewith, a cage, a planet gear rotatably supported from said cage and meshing with said sun gear and said ring gear, and an output shaft fixed to said cage for rotation therewith.

17. The hand tool as defined in claim 16 further comprising armature bearings supporting said armature for rotation in said case, a first support member mounted along the inside of said case between the permanent magnets and said ring gear having a first recess for retaining an outer race on one of said armature bearings and a second recess for retaining a further bearing for supporting one end of said cage; and a second support member mounted to said case for retaining another bearing for supporting the output shaft.

18. The hand tool as defined in claim 16 wherein the output shaft is integral with said cage and is journalled in said other bearing retained by the second support member, and said second support member is mounted to the inside of said case.

References Cited

UNITED STATES PATENTS

| 1,080,026 | 12/1913 | Taylor | 318—293 |
| 2,394,111 | 2/1946 | Schaelchlin et al. | 318—293 |
| 3,034,376 | 5/1962 | Gonzalez | 310—50 X |
| 3,100,270 | 8/1963 | Case et al. | 310—154 |
| 3,182,215 | 5/1965 | Du Bois | 310—154 |
| 3,201,625 | 8/1965 | Smith et al | 310—154 |
| 3,321,650 | 5/1967 | Pedone et al. | 310—50 X |
| 3,336,490 | 8/1967 | Yelpo et al. | 310—50 |

WARREN E. RAY, *Primary Examiner.*

U.S. Cl. X.R.

310—50, 154, 181; 318—293

UNITED STATES PATENT OFFICE

CERTIFICATE OF CORRECTION

Patent No. 3,427,484 February 11, 1969

Henning Karlby et al.

It is certified that error appears in the above identified patent and that said Letters Patent are hereby corrected as shown below:

Column 6, line 69, "C-3" should read -- C-4 --. Column 8, line 29, "withou" should read -- without --. Column 10, line 21, before "as" insert -- and full-load --. Column 12, line 56, "armateur" should read -- armature --.

Signed and sealed this 24th day of March 1970.

(SEAL)
Attest:

Edward M. Fletcher, Jr.
Attesting Officer

WILLIAM E. SCHUYLER, JR.
Commissioner of Patents